United States Patent [19]

Saito et al.

[11] Patent Number: 4,860,108

[45] Date of Patent: Aug. 22, 1989

[54] IMAGE SENSING DEVICE FOR AN ELECTRONIC STILL CAMERA

[75] Inventors: Mitsuru Saito, Ibaraki; Kazuchika Sato, Kobe, both of Japan

[73] Assignee: Minolta Camera Kabushiki Kaisha, Osaka, Japan

[21] Appl. No.: 138,435

[22] Filed: Dec. 28, 1987

[30] Foreign Application Priority Data

Dec. 29, 1986 [JP] Japan ............................. 61-311268
Dec. 30, 1986 [JP] Japan ............................. 61-311898

[51] Int. Cl.$^4$ ........................................... H04N 5/238
[52] U.S. Cl. ..................... 358/209; 358/213.13; 358/213.19; 358/225; 358/909
[58] Field of Search ............... 358/209, 909, 228, 229, 358/225, 213.13, 213.14, 213.19

[56] References Cited

U.S. PATENT DOCUMENTS

| 4,635,123 | 1/1987 | Masunaga | 358/909 |
| 4,647,975 | 3/1987 | Alston | 358/209 |
| 4,677,489 | 6/1987 | Nishimura | 358/909 |
| 4,689,689 | 8/1987 | Saito et al. | 358/228 |

FOREIGN PATENT DOCUMENTS

| 156274 | 9/1983 | Japan | 358/909 |
| 154574 | 11/1984 | Japan . | |
| 60-212082 | 10/1985 | Japan . | |
| 61-52635 | 3/1986 | Japan . | |
| 61-52636 | 3/1986 | Japan . | |
| 61-139168 | 6/1986 | Japan . | |
| 2089169 | 6/1982 | United Kingdom | 358/909 |

Primary Examiner—Tommy P. Chin
Attorney, Agent, or Firm—Burns, Doane, Swecker & Mathis

[57] ABSTRACT

An electronic still camera is designed to be operable for flash photography in collaboration with an electronic flash unit. This camera has an image pickup element for photoelectrically converting an image of an object to be photographed formed by a taking lens. The output of the image pickup element is subjected to gain control in a gain control circuit, after which it is converted into a signal suited for storing in a storing section. Further, this camera has a stop signal generating medium for stopping the flashing of the electronic flash unit when the integrated value of the light reflected from the object to be photographed reaches a predetermined value, a photoelectric conversion element for performing receipt and integration of light which has passed through the taking lens during the charge accumulation period of the image pickup element, and a gain determining circuit for determining the gain of the gain control circuit. And, determination of the gain is performed according to the difference between the output value of the photoelectric conversion element at the time of completion of charge accumulation of the image pickup element and a predetermined value.

5 Claims, 4 Drawing Sheets

IMAGE SENSING DEVICE FOR AN ELECTRONIC STILL CAMERA

BACKGROUND OF THE INVENTION

1. Field of the Invention

The present invention relates to an electronic still camera. More specifically, it relates to an electronic still camera having a charge accumulation type image pickup means furnished with a function of photographing a still image and converting it into an electric signal.

2. Description of the Prior Art

In Japanese Patent Laid-open Publication No. 194574/1984 there is proposed a still video camera which is designed to perform control of exposure to CCD (charge coupled device) based on the light measuring value prior to the exposure and gain control of an image signal of CCD. However, with such camera it was not possible to meet the case of a sudden change in the luminance of an object to be photographed during the exposure period. Further, there is proposed in Japanese Patent Laid-open Publication No. 52635/1986 a still video camera which is designed to measure during the exposure period a light equivalent to a light which is actually incident on the CCD and control the shutter speed based on the photometric value so as to obtain a proper exposure.

According to the latter system, even when the luminance of the object to be photographed shows a sudden change, proper exposure is obtainable, but it occurs for a photographer to mistake as if the exposure control were made based on the light measuring value of the luminance of the object to be photographed before exposure. Also, in case of a sudden lowering of the luminance of the object to be photographed, it may occur for the shutter speed to be lengthened beyond the limit of blurring or it may become impossible to obtain the desired shutter effect.

In general, in a lens shutter type camera using a silver salt film, an exposure error in a shutter serving also as a diaphragm usually occurs to a degree of $\pm 1$ Ev. In a single lens reflex focal plane shutter type camera as well, an exposure error to a degree of $\pm 0.5$ Ev may sometimes occur. By the way, in an electronic still video camera, because of the narrow dynamic range in the image pickup means such as CCD and its signal processing system, the exposure error must be suppressed to a range within $\pm 0.2$ Ev. The same requirement applies to a case photographing in collaboration with an electronic flash unit.

However, especially in a camera of such a construction as to perform control of stoppage of flashing of the electronic flash unit based on the light measuring value, the flashing does not exactly stops at the desired flash stopping time based on the light measuring value but stops after lag of some degree, so that an over-exposure due to value in flash light amount control is produced. Accordingly, when an electronic flash unit is used, an exposure error is produced.

SUMMARY OF THE INVENTION

Accordingly, it is an object of the present invention to provide an electronic still camera with which an image signal can be stored in a storing device in a proper value within an exposure error of $\pm 0.2$ Ev.

Another object of the present invention is to provide an electronic still camera with which an image signal can be stored in a storing device in a proper value with small exposure error in case of the use of an electronic flash unit.

Briefly speaking, an electronic still camera according to the present invention is designed to integrate during exposure a light equivalent to a light incident on an image pickup element and, based on the result of the integration, control the gain of an image signal which is an output from the image pickup element, thereby performing a correction.

Accordingly, according to the present invention, it is possible to store the image signal in a storing means in such a form that the exposure errors arising from various causes, e.g., the exposure erros inherent to a diaphragm, a shutter, an electronic flash unit, etc. and the exposure error caused by variation of luminance of an object to be photographed during exposure, have been corrected.

Such an electronic still camera of the present invention is concretely constructed by the following elements:

a taking lens; a first photoelectric conversion means including a charge accumulating means for photoelectrically converting an image of an object imaged by said taking lens into an image signal and outputting the image signal; a gain control means for controlling the gain of the image signal outputted from said first photoelectric conversion means; a signal processing means for processing a signal outputted from said gain control means to convert into a signal necessary for storing the image signal; a storing means for storing the signal outputted from said signal processing means; a flash light amount control means for integrating a light projected from said electronic flash unit and reflected from the object to be photographed and outputting a signal for stopping the flashing operation of said electronic flash unit when said integrated amount reaches a predetermined value; an accumulation control means for controlling the charge accumulating operation of said first photoelectric conversion means; a second photoelectric conversion means for performing receipt and integration of a light which has passed through said taking lens during the control period of said accumulation control means; and a gain determining means for determining the gain of said gain control means in proportion to the difference between the output of said second photoelectric conversion means at the time of termination of the charge accumulating operation and a predetermined value.

Alternatively, the present invention may be constructed by the following elements:

a taking lens; a first photoelectric conversion means including a charge accumulating means for photoelectrically converting an image of an object to be photographed formed by said taking lens into an image signal and outputting the image signal; a light measuring means for measuring a brightness of said object to be photographed; an exposure determining means for determining an exposure factor based on the light measuring value of said light measuring means; an exposure control means for controlling the electric charge accumulating operation of said photoelectric conversion means based on the determined exposure factor of said exposure determining means; a gain control means for controlling the gain of the image signal outputted from said first photoelectric conversion means; a signal processing means for processing a signal outputted from said gain control means to convert into a signal necessary for storing the image; a storing means for storing the signal outputted from said signal processing means; an accumulation control means for controlling the charge accumulating operation of said first photoelectric conversion means; a second photoelectric conversion means for performing receipt and integration of a light passing through said taking lens; and a gain determining means for determining the gain of said gain control means in proportion to the difference between the output of said second photoelectric conversion means at the time of termination of the charge accumulating operation and a predetermined value.

BRIEF DESCRIPTIO OF THE DRAWINGS

These and other objects and features of the present invention will become apparent from the following descriptio taken in conjunction with preferred embodiments thereof with reference to the accompanying drawings, throughout which like parts are designated by like reference numerals, and in which.

DETAILED DESCRIPTION OF THE PREFERRED EMBODIMENT

Figure 1:
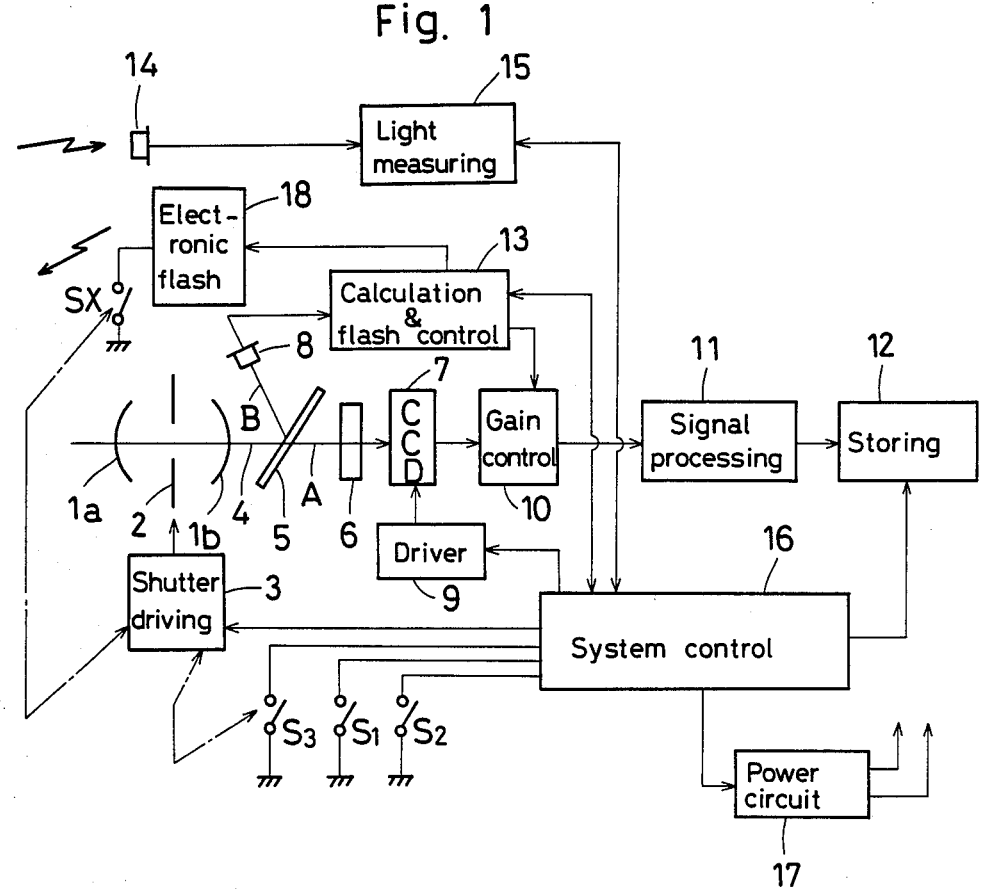
FIG. 1 is a block circuit diagram of an electronic still camera to which the present invention is applied.

FIG. 1 shows in a block circuit the construction of the essential part of the electronic still camera embodying the present invention. On the pupil plane of the taking lenses 1a and 1b there is disposed a between-the-lens shutter 2 having the functions of both the diaphragm and the shutter. This lens shutter 2 is designed to be subjected to open/close driving by a shutter driving mechanism 3. Behind the lens shutter 2, there is provided an optical diverging means 5 comprising a half-mirror fixedly disposed by inclination at a designed angle to the optical axis 4. This optical diverging means 5 causes the incident light to diverge in the first direction (A) and the second direction (B). The light led in the first direction thereof passes through an optical low pass filter 6 to reach a CCD 7, and the light led in the second direction is received by a light measuring means 8 comprising a photoelectric conversion element.

As a photoelectric conversion type image pickup device a CCD 7 is used here. This CCD 7 is driven by a driver circuit 9. At that time, the photoelectrically converted two-dimensional image information signal is outputted as a time-sequential one dimensional image information signal, and is given to a gain control circuit 10 disposed at the next stage.

The image signal which has been subjected to gain control in the gain control circuit 10 is subjected to various processings in the signal processing circuit 11 to be made into a signal form conforming to the specification of the electronic still camera, and recorded on a magnetic disk in the next storing section 12. The above signal processing circuit 11 is furnished with signal processings such as γ-correction, color separation, white balancing, matrix between the color difference signal and the luminance signal, modulation, synthesis, etc. The storing section 12 may be provided either integrally with the camera body or independently. The output of the above light measuring means 8 is inputted to a circuit 13 for calculating the exposure errors and generating a signal to terminate the flashing [hereinafter to be referred to as "calculation & flash control circuit"]. With respect to this calculation & flash control circuit 13, detailed description will be given later along with FIG. 2. A light receiving element 14 for determining the exposure value is provided at a position separate from the taking lens, and supplies its output to a light measuring circuit 15.

A system control circuit 16, forming the nucleus of the control operations of the camera, performs receipt & delivery of signals from and to the calculation & flash control circuit 13 and light measuring circuit 15, and gives control signals to the shutter driving mechanism 3, CCD driver circuit 9, storing section 12, and power circuit 17. The circuit 16 is also connected to a light measuring switch (S1), a release switch (S2), a switch to show completion of the shutter closure (S3), etc., and takes in the information of these switches (S1), (S2), and (S3). The switch (S3) is turned ON on completion of the shutter closure, and OFF on completion of the shutter charging. To an electronic flash unit 18 there is connected a synchro-switch (SX) to be turned ON at the beginning of the shutter closure by the linked movement with the shutter driving mechanism 3. By switching ON of this synchro-switch, flashing of the electronic flash unit 18 is commenced. Stoppage of flashing of the electronic flash unit 18 is performed by the flash stopping signal from the calculation & flash control circuit 13.

Figure 2:
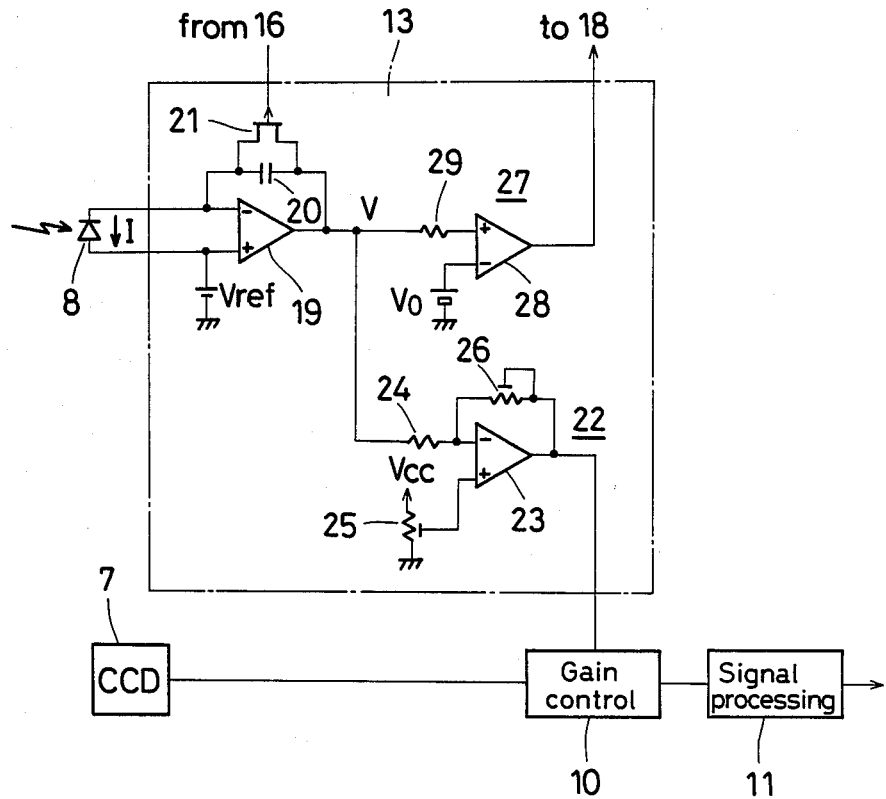
FIG. 2 is a circuit diagram showing in detail the construction of a part of it.

FIG. 2 shows a concrete embodiment of the aforementioned calculation & flash control circuit 13, in which an operational amplifier 19 is connected to the above light measuring means 8. Between the output terminal and the inverted input terminal (−) of the operational amplifier 19, there is connected a capacitor 20 for integrating and accumulating the photometric current (I), and further, at both ends of this capacitor 20 there are connected the source and drain of the field effect transistor which is to operate as a switch. The field effect transistor 21 is connected at its gate to the output of the system control circuit 16, so that, when a low level voltage is given from the system control circuit 16, it is turned ON to short-circuit the two ends of the capacitor 20, and when a high level voltage is given, it is turned OFF to make it possible for the capacitor 20 to charge (integration). To the non-inverted input terminal (+) of the operational amplifier 19 there is applied a voltage (Vref) to show the sensitivity of the CCD 7 corresponding to the film sensitivity value for the case of the silver salt film. The output voltage of the above operational amplifier 19 is given to the inverted input terminal (−) of the operational amplifier 23 in a deviation calculating section 22 through a resistor 24. On the other hand, a potentiometer 25 is connected between the non-inverted input terminal (+) of the operational amplifier 23 and the ground, and a variable resistor 26 between the output terminal of the operational amplifier 23 and the inverted input terminal (−) of the operational amplifier 23. Of the outputs of this deviation calculating section 22, the output in the period in which the charge transfer is performed in the CCD 7 is adjusted by the above variable resistor 26 and potentiometer 25 so as to produce an exposure error amount signal corresponding to the difference between the voltage proportionate to the proper exposure level and the output voltage of the above operational amplifier 19 at the completion closure of the shutter. The error calculating section 22 gives this exposure error amount signal to the gain control circuit 10 as a gain control signal to compensate the portion based on the exposure error of the image signal from the CCD 7. The stop signal generating section 27 in the above calculation & flash control circuit 13 has a comparator 28. To the minus terminal (−) of this comparator 28 a voltage (Vo) proportionate to the proper exposure level is applied, and to the plus input terminal (+) an output voltage (V) of the above operational amplifier 19 is given through a resistor 29. When the output voltage (V) of the operational amplifier 19 rises on to exceed the proper exposure voltage (Vo), the output voltage of the comparator 28 is inverted from a low level to a high level, and the resulting high level voltage is supplied to the electronic flash unit 18 as a flash stopping signal.

Then, the operations of the embodiment shown in FIGS. 1 and 2 will be illustrated with reference to FIGS. 3 to 5.

Figure 3:
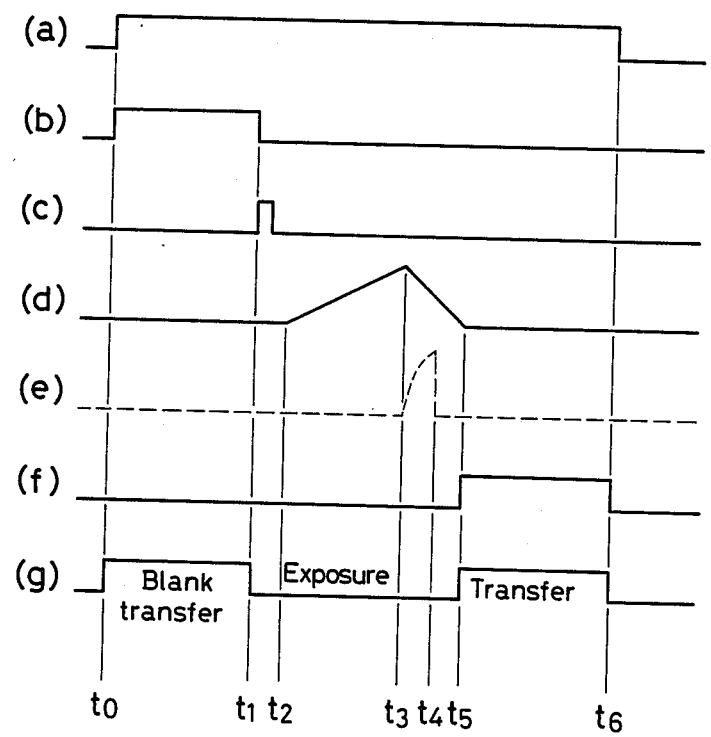
FIG. 3 and FIG. 4 are time charts of signals for illustrating the operation of said electronic still camera.
Figure 4:
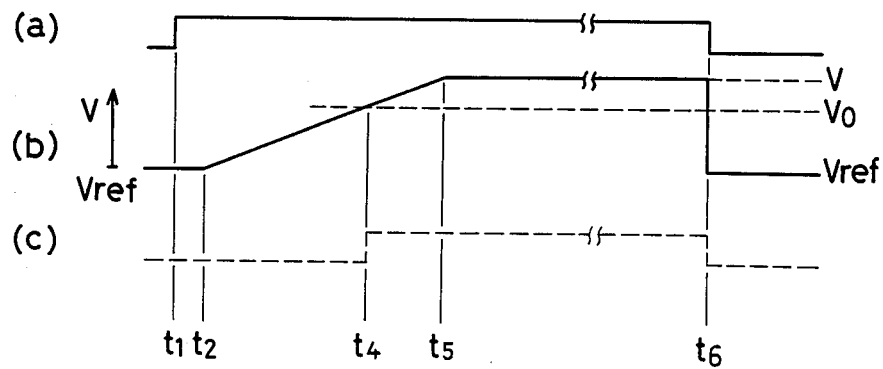

In FIG. 3, (a) shows the operation of the power circuit 17, which is operated under a high level and not operated under a low level. (b) likewise shows the operation of the light measuring circuit 15. (c) shows a releas pulse formed when the release switch (S2) is ON state. (d) shows an operation of the shutter 2, the ordinate representing the aperture opening of the shutter. (e) shows electronic flash light. (f) shows the operation state of the shutter closure completion switch (S3), a high level representing ON, and a low level OFF. (g) shows a transfer operation of electric charge accumulated in the CCD 7, wherein (t0) shows the timing of the power ON; (t1) the release switch (S2) ON; (t2) a start of opening the lens shutter 2; (t3) a start of closing the shutter; (t4) stoppage of flashing of the electronic flash unit; (t5) the completion of closing the shutter; and (t6) the completion of recording and power OFF, respectively.

Firstly, explanation will be given on the operation in the case where the electronic flash unit is not used.

t0~t1: When a shutter release button (not illustrated) provided on the outer surface of the camera is half-depressed, the photometric switch (S1) is turned ON, and in response thereto a signal for energizing the power circuit 17 is outputted from the system control circuit 16 and power is supplied to each part inside the camera (t0). Also, the system control circuit 16 directs the light measuring circuit 15 to start operation. Based on the light measuring value from the light measuring circuit 15 the exposure value is determined. This exposure value data is given to the system control circuit 16. With respect to the CCD, a blank transfer for removal of smear (charge transfer of the transfer section of the CCD only) is performed by the control of the driver circuit 9.

t1~t5: Then, when the shutter release button is fully pressed, the release switch (S2) is turned ON [t1] to cause the shutter driving mechanism 3 to start the shutter opening. In other words, exposure is started. Since the CCD has stopped the transfer by the release switch ON [t1], it accumulates photoelectric charge from the start of the shutter opening. The shutter 2 starts to close at [t3] based on the above exposure data and completes closing at [t5]. During the exposure, the light incident on the taking lens (1a) passes through the shutter 2, and is divided into two directions by the optical diverging means 5. As aforedescribed, one divisional light passes through the low pass filter 6 to reach the CCD 7 and have the CCD pick up images. The light in the other direction is received by the light measuring means 8 and produces the photo-current (I) proportionate to the intensity of light. By the turning ON of the release switch (S2) [t1], a signal for making said transistor 21 OFF [FIG. 4 (a)] is supplied to the field effect transistor 21 from the system control circuit 16, and the short-circuiting of the capacitor 20 is released. By this step, an operation to integrate the photo-current (I) of the light measuring means 8 is started with the capacitor 20 and the operational amplifier 19 to obtain an output voltage (V) of the operational amplifier 19 as shown in the following equation:

$$V = \frac{1}{C} \int I \cdot dt + Vref$$

wherein:

$$\frac{1}{C} \int I \cdot dt$$

is an accumulated voltage of the capacitor 20, and Vref is a sensitivity value voltage of the CCD 7. This voltage starts to rise from [t2] and reaches a constant value at the completion of the shutter closure [t5], as shown in FIG. 4 (b).

t5~t6: When the shutter (2) is fully closed, the CCD starts transferring, and sends the accumulated photoelectric charge as an image signal to the gain control circuit 10. On the other hand, the output of the error calculating section 22 is used in the period of t5~t6 in which the shutter 2 is fully closed. The output voltage V in this period is termed as V1. Now, assuming the voltage proportionate to the proper exposure level to be V2, in case of V1>V2, the state shows overexposure and the output of the CCD 7 is large, so the error calculating section 22 outputs an exposure error signal for reducing the gain in the gain control circuit 16. Reversely, in case of V1<V2, the state shows underexposure and the output of the CCD 7 is small, so the error calculating section 22 outputs an exposure error signal for increasing the gain in the gain control circuit 16. In the gain control circuit 16, the gain is varied in proportion to the gain control signal (exposure error signal) from the above error calculating section 22 to correct the exposure error in the above image signal. In this manner, the corrected image signal is stored in the magnetic disk in the storing section 12 through the signal processing circuit 11. On completion of the recording, the power circuit 17 is turned OFF [t6].

Figure 5:
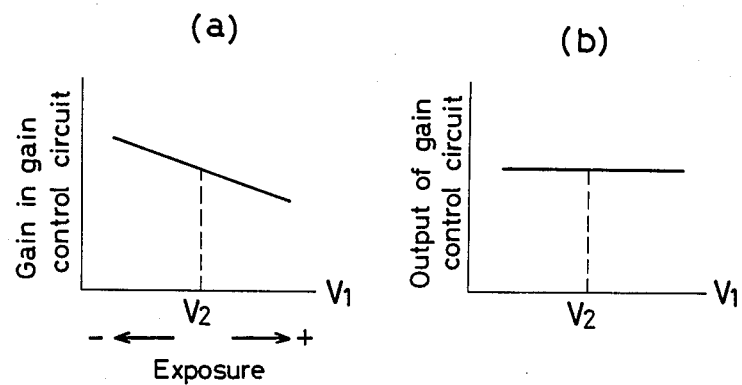
FIG. 5 is a chart showing the gain correction to the image signal.

FIG. 5 (a) shows a relation between the gain in the gain control circuit 10 and the output voltage V1 in the operational amplifier 19, and FIG. 5 (b) a relation between the output of the gain control circuit 16 after correction by the above exposure error signal and the output voltage V1 of the above operational amplifier 19.

Then, explanation will be given on the operation in the case of using an electronic flash unit. Linked with the start of closing of the shutter by the shutter driving mechanism 3, the synchro-switch (SX) is turned ON at [t3] to cause the electronic flash unit 18 to start flashing. The flashing of the electronic flash unit is stopped or interrupted [t4] in response to the flash stop signal [FIG. 4 (c)] from the stop signal generating section 27. In this case, since the operations of the error calculating section 22 and the gain control circuit 10 are the same as those in the case of the non-use of the electronic flash unit, the output of the gain control circuit 10 becomes the desired signal with correction of the exposure error. As briefly stated previously, the flash stop signal is outputted when the output voltage V of the operational amplifier 19 reaches the proper exposure voltage (V0) given to the minus input terminal (−) of the comparator 28.

In the foregoing embodiment, there may be used for example a MOSIC instead of the CCD as an image pickup means. While it was stated above that the image signal is stored on a magnetic disk in a storing section 12, the storing medium is not limited to such a magnetic disk but may be a magnetic tape. Alternatively, without using a magnetic medium as above, a semiconductor memory like RAM (random access memory) or an EEPROM may be used to memorize the image signal.

Further, whereas in the foregoing embodiment it is so designed that a part of the light incident on the CCD is caused to diverge by a half-mirror, and the diverging light is received by a light receiving section separate from the CCD, by which a flash stop signal is outputted, a modification may be made such that, for example, as in Japanese Patent Laid-open Publication No. 183880/1985, a light receiving element is additionally provided between the image elements on a part (e.g., a central part) of the image pickup range of CCD, so that a flash stop signal is generated when the light receiving amount of this light receiving element comes to a value corresponding to the proper exposure level.

Furthermore, it is to be noted that the application of this invention is not limited to the between-the-lens shutter type cameras but is extendible to the focal plane shutter type single lens reflex cameras.

In another embodiment of the present invention, a shutter is not necessarily provided, because, even without a shutter, a still image is obtainable by controlling the timing of the charge storage of CCD 7 or of the transfer thereof by the system controller 16 and the driver circuit 9.

Further, it should be understood that this invention is not limited to the given embodiment but may be subject to various alterations and modifications within the scope that does not diverge from the purport of the invention.

What is claimed is:

1. An image sensing device used for an electronic still camera, comprising:
   a taking lens;
   a charge accumulation type image sensing means for photoelectrically converting an image of an object to be photographed formed by said taking lens into an image signal and outputting the image signal;
   a charge accumulation control means for controlling initiation and termination of a charge accumulation operation of said image sensing means;
   a photoelectric conversion means for performing receipt and integration of a light which has passed through said taking lens during a control period of said charge accumulation control means;
   a gain control means for controlling the gain of the image signal outputted from said image sensing means; and
   a gain determining means for determining the gain of said gain control means in proportion to the difference between the output of said photoelectric conversion means after termination of the charge accumulation operation of said image sensing means and a predetermined value.

2. An image sensing device according to claim 1, wherein said charge accumulation control means includes a light measuring means for measuring brightness of said object to be photographed, and a time determination means for determining, based on the output of said light measuring means prior to the initiation of the charge accumulation operation of said image sensing means, a time corresponding to a period of time between the initiation and the termination of the charge accumulation operation of said image sensing means.

3. An image sensing device according to claim 2, wherein said charge accumulation control means further includes a shutter which is caused to gradually increase an opening thereof from a fully-closed state when the charge accumulation operation is initiated and to gradually decrease the opening thereof to the fully-closed state when the time determined by said time determination means has passed after the initiation of the charge accumulation operation.

4. An image sensing device according to claim 3, wherein the light received by said photoelectric conversion means passes through said shutter.

5. An image sensing device according to claim 1 further comprising:
   a flash light emission means for emitting a flash light when the charge accumulation operation of said image sensing means is performed;
   means for determining whether or not the output of said photoelectric conversion means reaches a predetermined value for flash photography and outputting a flash stop signal when the output of said photoelectric conversion means reaches the predetermined value for flash photography; and
   means for interrupting a flash light emission of said emission means in response to the flash stop signal fed from said means for determining.

* * * * *